United States Patent
Koelle

[11] Patent Number: 5,510,795
[45] Date of Patent: Apr. 23, 1996

[54] SINGLE ANTENNA LOCATION AND DIRECTION FINDING SYSTEM

[75] Inventor: Alfred R. Koelle, Santa Fe, N.M.

[73] Assignee: Amtech Corporation, Albuquerque, N.M.

[21] Appl. No.: 338,008

[22] Filed: Nov. 10, 1994

[51] Int. Cl.⁶ .................................................. G01S 13/58
[52] U.S. Cl. ................ 342/114; 342/42; 342/113
[58] Field of Search ................... 342/42, 51, 114, 342/115, 105, 116

[56] References Cited

U.S. PATENT DOCUMENTS

| | | | |
|---|---|---|---|
| 3,899,740 | 8/1975 | Unkauf et al. | 455/303 |
| 4,106,007 | 8/1978 | Johnston et al. | 340/310.02 |
| 4,121,102 | 10/1978 | Wilson | 342/44 X |
| 4,131,881 | 12/1978 | Robinson | 340/825.53 |
| 5,144,314 | 9/1992 | Malmberg et al. | 342/44 |
| 5,153,583 | 10/1992 | Murdoch | 340/825.54 |
| 5,181,038 | 1/1993 | Asbury et al. | 342/70 |
| 5,305,008 | 4/1994 | Turner et al. | 342/44 |

*Primary Examiner*—John B. Sotomayor
*Attorney, Agent, or Firm*—Roger S. Borovoy

[57] ABSTRACT

The invention provides a circuit for analyzing backscatter-modulated RF signals received from a remote transponder to determine whether the transponder is stationary or moving toward the reader or away from it and, if moving, the rate at which the transponder is coming or going. The circuit of the invention can be integrated with existing readers of the type described in U.S. Pat. No. 4,739,328 and requires only a single antenna. In response to the signal received from a transponder, the invention circuit generates three signals, each having a different phase. By analyzing the pattern and frequency of signal state changes in the three signals, the invention can determine the transponder's speed and direction of movement.

4 Claims, 5 Drawing Sheets

SINGLE ANTENNA LOCATION AND DIRECTION FINDING SYSTEM

This invention relates to a circuit for analyzing backscatter-modulated RF signals received from a transponder to determine whether the transponder is stationary or moving toward the receiver or away from it and, if moving, the rate at which the transponder is coming or going.

BACKGROUND OF THE INVENTION AND PRIOR ART

Systems for remote identification of objects are useful for many purposes, including identifying and locating objects such as trains or automobiles. Such systems use RF signals to communicate information between a reader apparatus and a transponder attached to the object. Each transponder has an individual code containing information related to and identifying the object to which it is attached. The reader sends an RF signal to the remote transponder. An antenna in the transponder receives the signal from the reader, backscatter-modulates the received signal with data temporarily or permanently stored in the transponder, thereby producing a sequence of signals in accordance with the transponder's individual code, and reflects this modulated signal back to the reader to pass the information contained in the transponder to the reader. The reader decodes these signals to obtain the information from the transponder. Likewise, the transponder may decode signals received from the reader and write information to the transponder's memory. The details of these transponders and readers have been previously described in U.S. Pat. No. 4,739,328, which is hereby incorporated by reference.

However, the system described in U.S. Pat. No. 4,739,328 provides no information about the speed and movement of the transponder with respect to the reader. While there are known techniques for determining relative movement, those techniques are unsatisfactory for use in the reader/transponder system described above. For example, a common Doppler radar can only sense velocity and direction of movement above some minimum relative velocity and it cannot sense when a target object is stationary. Also, Doppler radars typically use a low frequency range that is incompatible with the reader/transponder systems in which this invention is intended to function. Koelle and Depp described another technique in an article entitled, "Doppler Radar with Cooperative Target Measures to Zero Velocity and Senses the Direction of Motion," in Proceedings of the IEEE, March 1977. However, that technique requires use of additive and subtractive phase terms and is also incompatible with present reader/transponder systems that use frequency shift keying or biphase codes to convey information between the reader and transponder. Other techniques have been described using a receiver with more than one antenna, as in U.S. Pat. No. 4,728,955.

BRIEF DESCRIPTION OF THE INVENTION

The invention provides a circuit that can be integrated with a reader of the type described in U.S. Pat. No. 4,739,328 to determine the speed and relative motion of a transponder. Using a single antenna, the circuit of the invention can determine whether the transponder is coming toward the reader or going away from it, regardless of the speed of such movement, and can also determine when the distance between the reader and transponder is constant. In response to the signal the reader receives from the transponder, the circuit of the invention generates three signals, each having a different phase. The invention then detects when those signals change state (i.e., become inverted or non-inverted) and stores the pattern of signal state changes. Finally, the invention compares the present pattern of signal state changes to the pattern it has stored to determine the transponder's speed and direction of movement.

DETAILED DESCRIPTION OF A PREFERRED EMBODIMENT OF THE INVENTION

Figure 1:
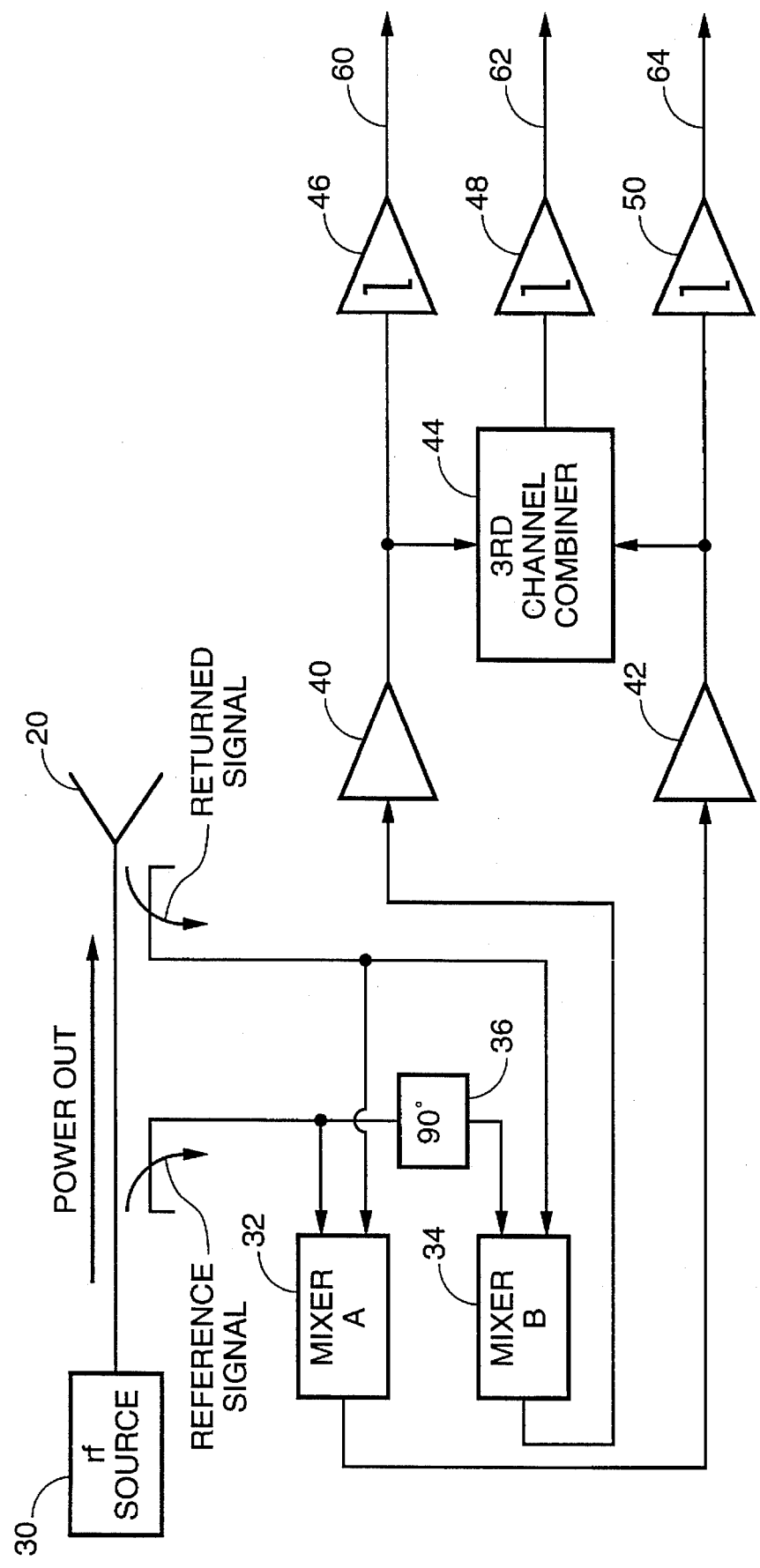
FIG. 1 is a schematic diagram showing a portion of the prior art reader circuit.

FIG. 1 shows a portion of the reader circuit described in U.S. Pat. No. 4,739,328. Antenna 20 receives signals from a transponder, and those signals are then introduced to mixers 32 and 34. The interrogating RF signals from source 30 are also introduced to mixer 32 and are shifted in phase by 90° as at 36 before being introduced to mixer 34. The signals from mixers 32 and 34 are respectively amplified linearly at 40 and 42 and then introduced to a mixer or third channel combiner 44. The signals from amplifier 40, mixer 44 and amplifier 42 are respectively introduced to amplifiers 46, 48 and 50, each of which provides a high gain followed by a limitation in amplitude.

The amplitudes of the output signals of RF mixers 32 and 34 are a function of the relative RF phase between the information-bearing input signal returned from the transponder and the reference RF signal generated by source 30. If A is the input signal from the antenna and $\phi$ is the RF phase shift between A and the reference signal, mixer output B (for Baseband signal, as this is a homodyne detector) will be $B = k A \cos(\phi)$, and will vary with $\phi$.

The phase of the RF signal returned to the reader antenna from the transponder relative to the phase of the RF signal being sent to the transponder by the reader is a function of the round trip distance over the path from the reader antenna to the transponder and back. If $\phi_r$ is the phase shift over distance r, and $\lambda$ is the wave length of the reader RF signal, then the phase shift is:

$$\phi_r = \frac{2r}{\lambda}$$

As the distance r between the transponder and the reader varies, then, there is a corresponding variation in $\phi_r$, which in turn affects the amplitudes of the outputs of mixers 32 and 34. As the transponder moves from one location to another one can observe this motion in the way the output signals from mixers 32 and 34 change relative to each other. Thus, in addition to a sequentially coded message that is amplitude modulated onto the reflected RF carrier signal, as described in U.S. Pat. No. 4,739,328, the transponder return signal carries information as to the location of the transponder relative to the reader antenna in its RF phase.

In prior art implementations, this phase shift—and therefore the transponder position information—was ignored, and the reader was used only to decode and reproduce the transponder message code. Indeed, the system described in U.S. Pat. No. 4,739,328 is designed to prevent the varying RF phase of the transponder return signal from interfering with the decoding process.

Figure 2:
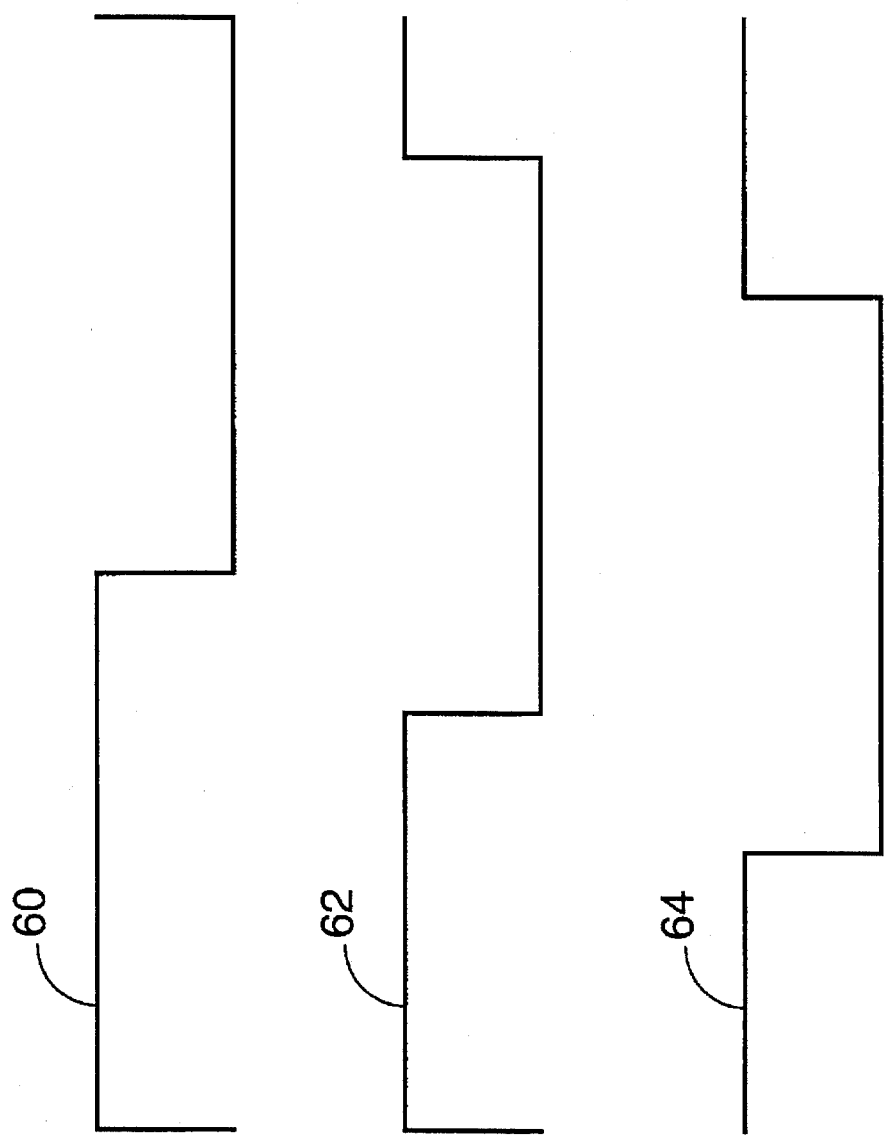
FIG. 2 illustrates the states of inversion of the signals generated by the circuitry in FIG. 1.

Referring to FIG. 2, signals 60, 62 and 64 represent the amplitudes and states of inversion of the output signals provided by amplifiers 46, 48 and 50, respectively. These amplifiers are limiting amplifiers. For all input signals larger than very small ones (which are below the level that may be processed) the output is a pulse train of standardized peak-to-peak amplitude. The actual output signals from amplifiers 46, 48 and 50 are binary signals because the voltage is either at one limiting value or the other. In addition, these three signals can be inverted relative to each other, depending on the relative phases of the antenna return signal and the reference signal into mixers 32 and 34 (FIG. 1).

FIG. 2 shows how the states of inversion of the three signals 60, 62 and 64 change with $\phi_r$. FIG. 2 also shows the inversion states changing abruptly with changes in phase, which is a close approximation to their actual behavior because the amplification is so high that a very small change in phase makes the difference between a fully limited amplifier output signal of one polarity versus an amplifier output signal of the opposite polarity. Signals 60, 62 and 64 collectively supply information about the transponder's speed and direction of movement. The invention provides a circuit to extract and report that information.

Figure 3:
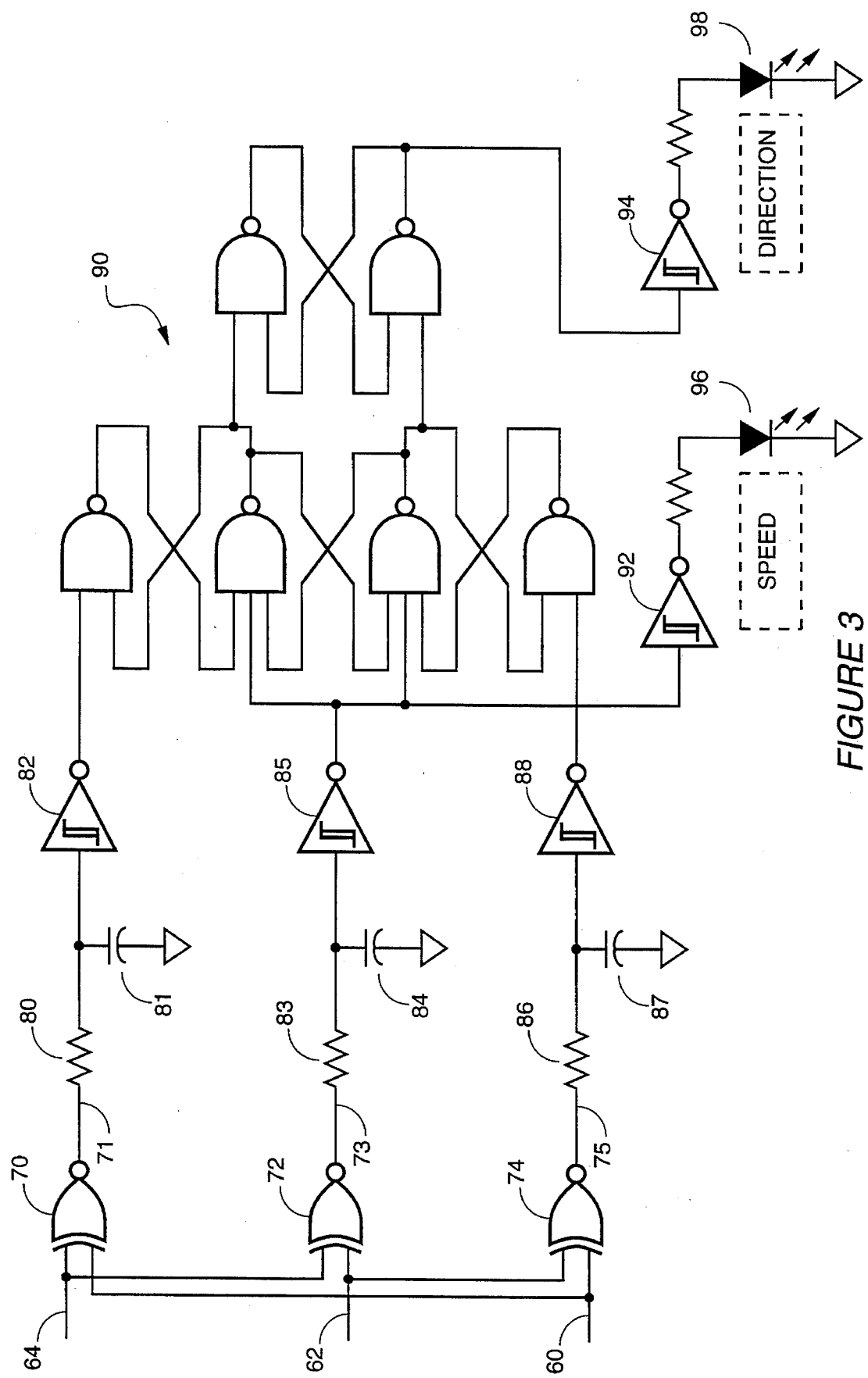
FIG. 3 is a schematic diagram of the circuit of the invention.
Figure 4A:
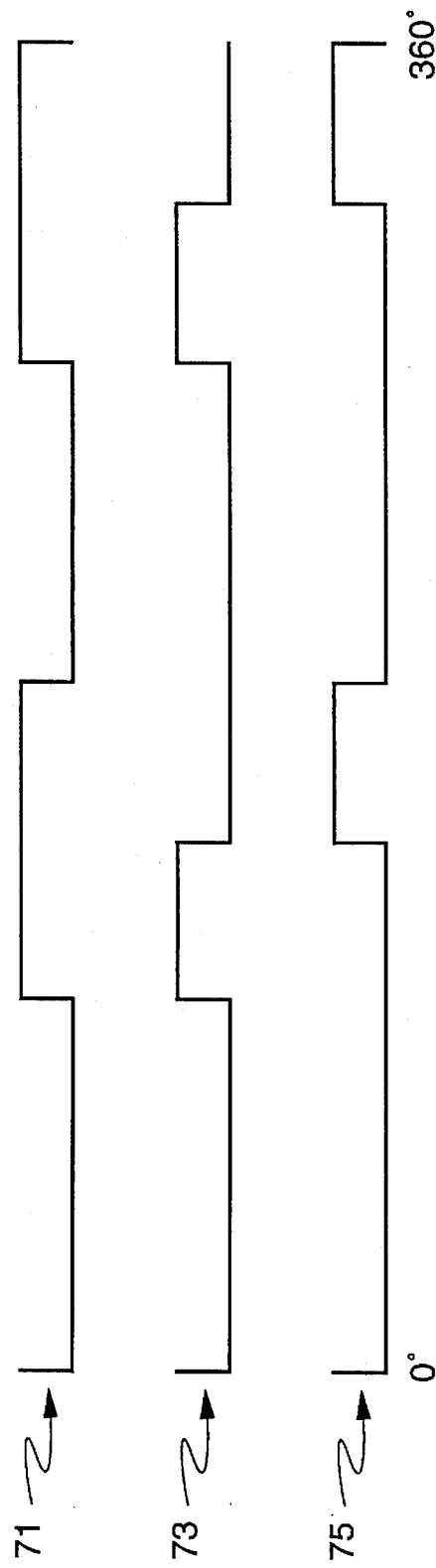
FIGS. 4a and 4b illustrate waveforms of signals generated by the circuit of the invention and used to determine speed and relative movement.
Figure 4B:
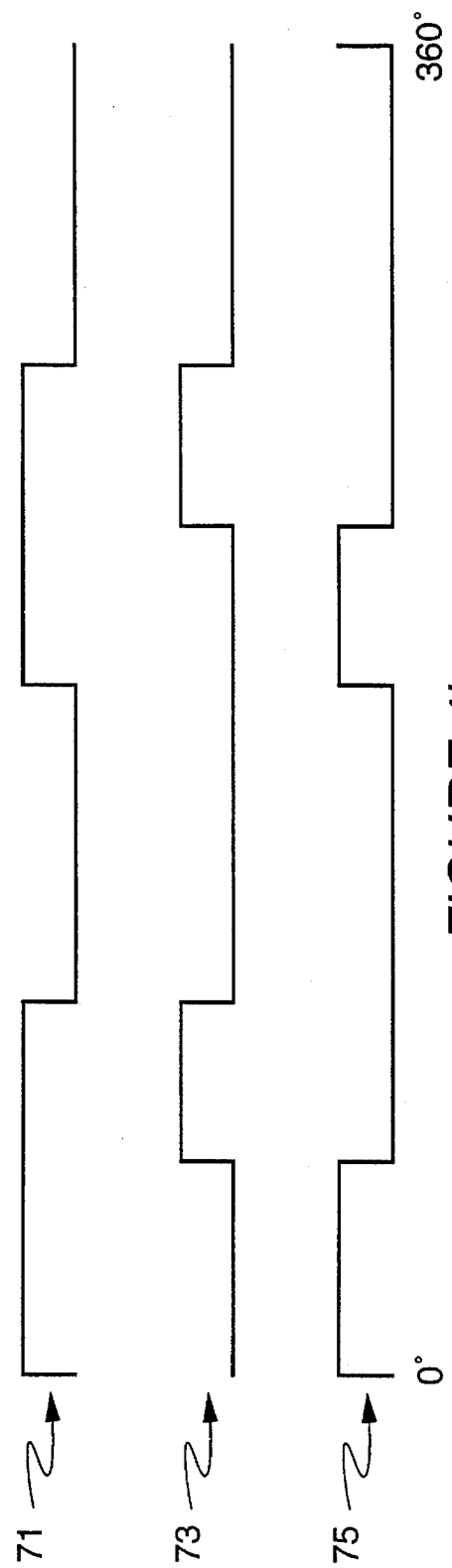

FIG. 3 shows an elementary circuit that will determine speed and direction from signals 60, 62 and 64. Exclusive-OR gate 70 operates on signals 60 and 64 to produce signal 71. Similarly, exclusive-OR gate 72 operates on signals 62 and 64 to produce signal 73 and exclusive-OR gate 74 operates on signals 60 and 62 to produce signal 75. Typical waveforms for signals 71, 73 and 75 are shown in FIGS. 4a and 4b. FIG. 4a shows the pattern of signal state changes that occurs when the transponder is moving away from the reader—i.e., when the RF phase angle is increasing. FIG. 4b shows the pattern of signal state changes that occurs when the transponder is moving toward the reader—i.e., when the RF phase angle is decreasing. As can be seen from FIGS. 4a and 4b, the order or sequence of signal state changes varies, depending on whether the transponder is moving toward or away from the reader.

Referring again to FIG. 3, resistor 80 and capacitor 81 collectively operate as a low-pass filter to remove transient signal spikes or slivers in signal 71 that may be caused by slight differences in the edge timing of signals 60 and 64. Resistor 83 and capacitor 84 provide low-pass filtering for signal 73, and resistor 86 and capacitor 87 perform the same function for signal 75. Although analog circuitry is shown, the desired low-pass filtering can also be accomplished using digital circuitry. Schmitt triggers 82, 85 and 88 reshape signals 71, 73 and 75, respectively, to provide fast transitions. The flip flops in logic element 90 store the signal state change information provided by signals 71, 73 and 75 and determine whether the pattern of signal state changes indicates that the transponder is coming toward the reader or moving away from it. Logic element 90 reports the transponder's direction of movement by causing light-emitting diode 98 either to activate or remain dark.

It can be seen from FIGS. 4a and 4b that signals 71, 73 and 75 each change state at regular intervals as the distance between the transponder and reader changes. Thus, the transponder's speed can be determined by observing the frequency of signal state changes in any of signals 71, 73 or 75. Referring to FIG. 3, signal 73 is connected to light-emitting diode 96, which toggles on and off as the state of signal 73 changes. The frequency at which LED 96 toggles is directly proportional to the speed of the transponder.

Figure 5:
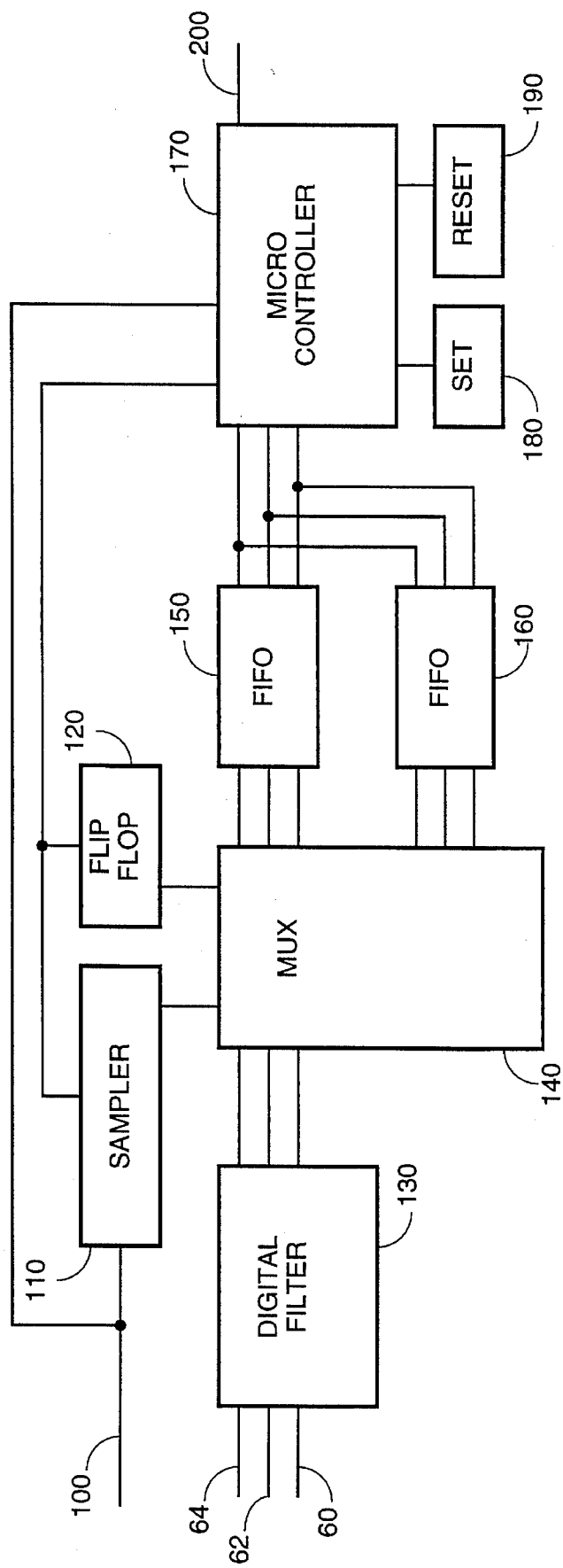
FIG. 5 is a block diagram of another embodiment of the invention.

In an alternative embodiment, a microcontroller is used to determine the transponder's direction of movement. In FIG. 5, for example, signals 60, 62 and 64 are passed through digital pattern filter 130. The filtered signals are then fed to multiplexer 140, which routes the incoming signals either to FIFO 150 or FIFO 160, as directed by flip-flop 120. Each FIFO is designed to store n samples, where n corresponds to the transponder frame period. The reader generates a "LOCK" signal on line 100 to denote that it has received and read a complete and valid transponder frame. Upon receipt of a LOCK signal on line 100, sampler 110 triggers flip flop 120 which in turn instructs MUX 140 to begin directing samples to the other FIFO. If a FIFO has loaded n samples and sampler 110 has not yet received a LOCK signal on line 100, then the FIFO will load an additional sample (n+1) and discard the first of the n samples. This process continues until sampler 110 receives a LOCK signal. When LOCK occurs, the n samples stored in the chosen FIFO are presumed valid. At that point, MUX 140 begins sending samples to the other FIFO, and samples stored in the first FIFO are forwarded to microcontroller 170.

Microcontroller 170 determines if the patterns received from the FIFO are "coming" or "going" patterns, also referred to as "set" and "reset" patterns. It does so by comparing the received patterns to "set" and "reset" programmable pattern counters, which also tell the microcontroller how many repeating "set" or repeating "reset" patterns are needed confirm a match. While microcontroller 170 tests the output of one FIFO, the other FIFO collects the next group of pattern samples. Thus, the microcontroller must finish testing the samples from the first FIFO before the next LOCK signal or complete transponder frame can occur, at which time the microcontroller will receive a new group of pattern samples from the other FIFO. Microcontroller 170 first compares received patterns to the "set" pattern counter. After it finds a match with the "set" pattern counter, it looks for a match with the "reset" pattern counter. Once it has matched both "set" and "reset" patterns, microcontroller 170 generates a pulse on line 200 and restarts its comparison testing procedure.

If sampler 110 does not receive a LOCK signal by the time its internal counter reaches n, it generates a signal that restarts the "set" and "reset" test procedure in microcontroller 170. Receipt of a LOCK signal on line 100 causes the counter in sampler 110 to be reset to zero.

As will be understood by those skilled in the art, many changes in the apparatus and methods described above may be made by the skilled practitioner without departing from the spirit and scope of the invention, which should be limited only as set forth in the claims which follow.

I claim:

1. A circuit for determining speed and direction of movement for use in a single-antenna reader in a system including a reader and a transponder displaced from the reader, comprising:

means for generating first, second and third signals responsive to a signal received from a transponder, said first, second and third signals being differentially phased;

means for detecting and reporting the pattern of signal state changes in said first, second and third signals;

means for storing the pattern of signal state changes reported by said detecting and reporting means; and means for comparing the present pattern of signal state changes reported by said detecting and reporting means with the previous pattern recorded in said storage means and for determining speed and direction of movement therefrom.

2. The circuit for determining speed and direction of movement for use in a single-antenna reader in a system including a reader and a transponder displaced from the reader of claim 1 in which the means for detecting and reporting comprises:

first exclusive-OR gate having for its inputs said first and second signals;

second exclusive-OR gate having for its inputs said first and third signals; and third exclusive-OR gate having for its inputs said second and third signals.

3. A circuit for determining direction of movement for use in a single-antenna reader in a system including a reader and a transponder displaced from the reader, comprising:

means for generating first, second and third signals responsive to a signal received from a transponder, said first, second and third signals being differentially phased;

means for detecting and reporting the pattern of signal state changes in said first, second and third signals;

means for storing the pattern of signal state changes reported by said detecting and reporting means; and means for comparing the present outputs of said first, second and third detecting and reporting means with the past outputs recorded in said storage means and for determining direction of movement therefrom.

4. A circuit for determining transponder speed for use in a single-antenna reader in a system including a reader and a transponder displaced from the reader, comprising:

means for generating a signal responsive to a signal received from a transponder;

means for detecting and reporting signal state changes in said responsive signal;

means for determining the frequency of the signal state changes reported by said detecting and reporting means and for determining speed therefrom.

* * * * *

UNITED STATES PATENT AND TRADEMARK OFFICE
CERTIFICATE OF CORRECTION

PATENT NO. : 5,510,795
DATED : April 23, 1996
INVENTOR(S) : Alfred R. Koelle

It is certified that error appears in the above-indentified patent and that said Letters Patent is hereby corrected as shown below:

COLUMN    LINE 4      33    After "needed" insert --to--

Signed and Sealed this

Twenty-seventh Day of August, 1996

Attest:

BRUCE LEHMAN

Attesting Officer     Commissioner of Patents and Trademarks